Patented Feb. 17, 1953

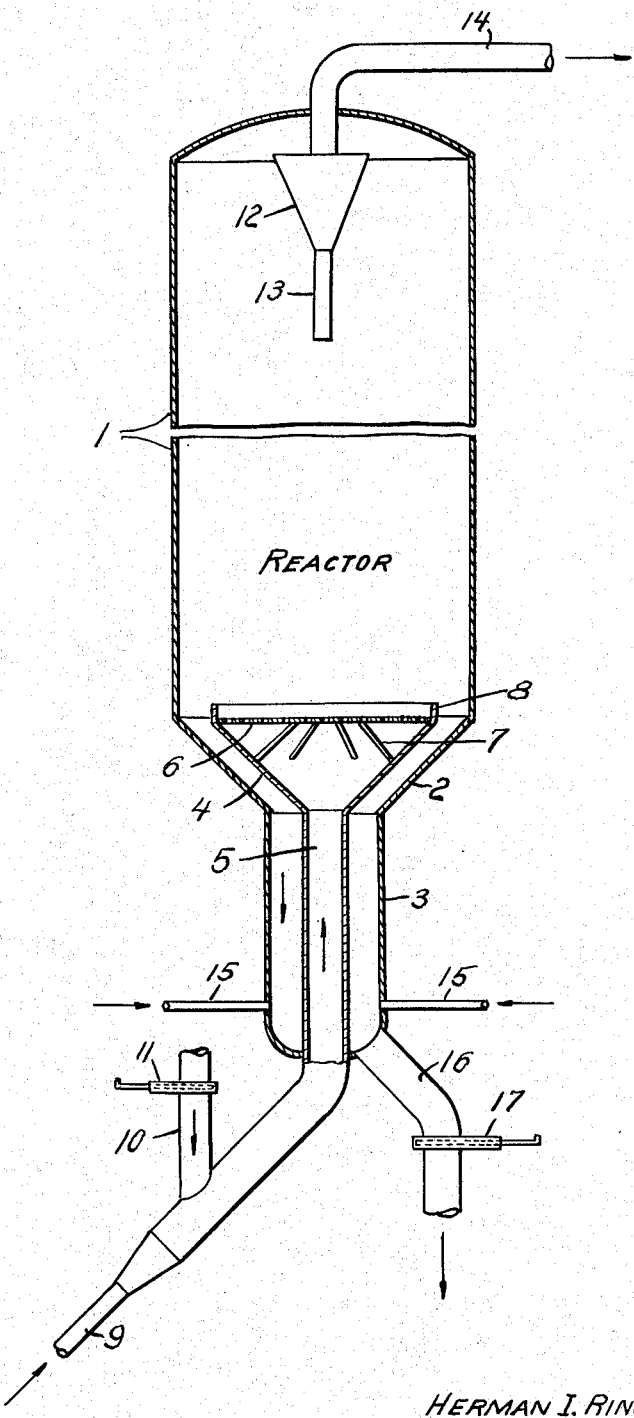

2,628,932

UNITED STATES PATENT OFFICE 2,628,932

PYROLYTIC CONVERSION OF HYDRO-
CARBONS WITH THE AID OF A FLUID
CATALYST

Herman I. Ringgenberg, Whiting, Ind., assignor to Sinclair Refining Company, New York, N. Y., a corporation of Maine Application March 15, 1951, Serial No. 215,783

2 Claims. (Cl. 196—52)

My invention relates to improvements in apparatus for and in the system of handling catalyst and oil in the reaction side of the fluid catalyst cracking process. In the process, a finely divided catalyst is charged to an enlarged reaction chamber in suspension in the hydrocarbon stock to be converted. In the reactor the suspended catalyst is permitted to settle out and form a dense fluidized phase. The converted hydrocarbon products are withdrawn overhead in the reactor and separated from entrained fines. Spent catalyst is withdrawn from the lower end of the reactor, usually after stripping vaporizable hydrocarbons from the catalyst by contact with a gaseous stripping medium, and is delivered to the regeneration side.

My invention is directed to the problem of providing optimum stripping efficiency with minimum catalyst hold-up in the reactor and minimum catalyst degradation difficulties and to the problem of providing effective distribution of the feed mixture in the reactor bed while overcoming erosion of reactor internals. This application is in continuation of my pending application Serial No. 757,655 filed June 27, 1947, now abandoned. It was pointed out therein that conventional practice involves bringing the reactor feed line into the side of a conventional feed distributing cone, usually situated high within the reactor. The space below the feed cone provides an internal stripping zone but requires a very large catalyst inventory for the unit due to the additional hold-up of catalyst therein. It was further pointed out that in conventional units, the catalyst tends to settle out in the feed line with consequent severe erosion of the grid and the grid supports opposite the feed cone and into the feed cone. My invention as described therein provides an improved means and system of operation for minimizing these disadvantages and for obtaining special advantages in the way of minimizing erosion and improving stripping efficiency. The improved reaction of my invention comprises a vertically elongated reaction chamber having a cone-shaped hopper bottom terminating at its lower end in an elongated stripping column of smaller diameter than the diameter of the chamber. A feed cone is coaxially positioned within the hopper bottom of the chamber having the walls of the feed cone spaced a relatively small distance from and substantially parallel to the walls of the hopper bottom of the reaction chamber. A distributing grid covers the upper end of the feed cone, and a straight feed line positioned coaxially within the stripping column extends vertically upward into the lower end of the feed cone. The lower end of the stripping column is provided with means for injecting a gaseous stripping medium.

My invention also includes the method of handling the feed mixture and spent catalyst which comprises passing the suspended catalyst-hydrocarbon mixture vertically upward through the feed line coaxially positioned within the stripping column, uniformly discharging the suspension outwardly and upwardly into the lower portion of the reaction chamber, circulating the spent catalyst from the bottom of the reaction chamber downwardly into and through the unobstructed annular section of the stripping column surrounding and in heat exchange relationship with the entering feed mixture, and stripping the vaporizable hydrocarbons from the descending spent catalyst by injecting a gaseous stripping medium at the lower end of the annular section.

In accordance with my invention, erosion of the grid and grid supports is materially reduced by feeding the suspension of catalyst in charge oil into the lower end of the feed cone, substantially coaxially with the cone. Further, the large body of unused catalyst in the reactor is substantially reduced in volume and residence time by providing the reactor with a cone-shaped bottom hopper and positioning the feed cone in the hopper so that the walls of the cone are spaced only a relatively small distance from the walls of the conical hopper bottom and advantageously substantially parallel thereto.

In the practice of my invention, the oil vapors rise substantially vertically through the reactor feed cone and the preferential falling of the catalyst to one side of the feed line or of the feed cone is avoided, providing better distribution and mixing of the catalyst and oil vapor in the reactor. As described below, it also has been found that other erosive forces of an unexpected character are eliminated or minimized.

In a particularly desirable modification of my invention, the feed line is passed upwardly through the depending stripping column so that the hot suspension of catalyst passes in heat exchange relation with the catalyst being stripped whereby heat is conducted to the catalyst in the stripper providing improved stripping conditions.

The invention will be further described and illustrated with reference to the accompanying drawing which represents, conventionally and somewhat diagrammatically, a vertical section of a reactor with dependent stripping column embodying my invention.

The apparatus, indicated by the reference number 1 of the accompanying drawing, represents a generally cylindrical, vertically elongated reaction chamber having a cone-shaped hopper bottom 2, terminating at its lower end in a stripping column 3. Coaxially positioned within the cone-shaped hopper bottom and spaced a relatively small distance from the walls thereof, is the feed cone 4, terminating at its lower end in a reactor feed line 5, extending coaxially downwardly through the stripping column 3. The feed cone is covered at its upper end by a grid 6 supported by grid supports 7. A skirt 8 extends upwardly from the grid.

In operation, preheated feed is passed through line 9 into the lower end of the feed line 5 where it picks up, in suspension, catalyst, for instance, freshly regenerated catalyst, introduced into feed line 5 through line 10 at a rate controlled by valve 11.

The suspension passes upwardly through line 5 into the lower end of the feed cone 4 and passes upwardly through the cone and the grid 6 into the lower end of the reactor. In the reactor, the catalyst tends to drop out of suspension, forming a dense phase body of catalyst in the reactor through which incoming hydrocarbon vapors pass upwardly, the catalyst, of course, being at an elevated temperature. Products of the conversion pass from the upper end of the reactor through a catalyst separator, such as a cycle-type separator, diagrammatically indicated at 12, for the separation of suspended catalyst. The separated catalyst is returned to the dense phase body of catalyst in the reactor through the downcomer 13 and the vapors pass therefrom through line 14 to fractionating apparatus, not shown in the drawing.

The dense phase body of catalyst gravitates downwardly through the annular space between the cone and the walls of the hopper bottom and flows into the annular stripping column chamber surrounding the feed line 5. Steam is introduced into the lower end of the stripper through lines 15, is uniformly distributed through the body of catalyst by known means and passes upwardly through the catalyst in the stripping column, stripping therefrom readily vaporizable hydrocarbons. The stripping steam and hydrocarbons pass upwardly through the reactor. Stripped catalyst is withdrawn from the lower end of the stripping column through line 16, at a rate controlled by valve 17, and is passed to a regenerating zone wherein the catalyst is regenerated and the hot regenerated catalyst returned to feed line 5 through line 18.

In the operation shown, the stripping of the spent catalyst is facilitated by heat exchange with the incoming hot suspension, erosion of the grid and grid supports is materially reduced and a more uniform distribution of the freshly regenerated catalyst and hydrocarbon vapors in the reactor is effected.

The invention contemplates known methods and means for regenerating the catalyst and for conveying the catalyst from the stripper to the regenerator and back to the reactor.

The catalyst employed may be of the type conventionally used in fluid catalyst processes, for instance, a silica-alumina type catalyst, in finely divided or powdered form. The reaction temperature and pressure conditions may likewise be those conventionally used in operations of this type and, as understood by the art, the optimum temperatures and pressures will depend primarily upon the type of feed stock used, the particular catalyst employed and the reaction desired.

In the cracking of gas oil, for instance, the temperature maintained within the reaction zone may, with advantage, be within the range of 800° to 1000° F. and the pressure at the top of the reactor within the range of 5 to 25 pounds per square inch.

It has been found in operating with the improved reactor design and stripping method of my invention that substantial advantages are obtained despite a seeming sacrifice or compromise in terms of increased height of the unit above the ground. Thus, in the mechanical design of a fluid catalyst cracking unit, good catalyst circulation is the primary requirement. With operating pressures for the reactor and regenerator and the densities of catalyst in the transfer riser pipes from reactor to regenerator and vice versa usually set by design, the differential height of the regenerator grid above the reactor grid, assuming that the reactor operates under higher pressure as is almost universally the case, becomes a limiting factor in terms of height of the unit above ground. In any case, this must be sufficient to assure an adequate pressure drop across the slide valves in the reactor and regenerator standpipes. With a higher reactor pressure than regenerator pressure, it is apparent that the method of spent catalyst draw off from the reactor will set the ground elevation reference point for vertical construction of the unit. For this reason side entry of the feed mixture to the reactor with minimization of the length of stripping space below the reactor has been adopted by the art as the conventional and most desirable reactor and stripping design. My invention requires an increase in the height of the unit by employing an annular stripping chamber of relatively large height to diameter as an integral dependent lower part of the reaction vessel and a straight vertical feed pipe discharging into the bottom of the feed cone which extends upwardly through the stripping column and forms with it the annular stripping section. I have found however that the advantages in terms of erosion elimination, reduction in catalyst inventory and improvement in stripping efficiency substantially outweigh the increased initial cost due to the greater vertical elevation of the unit.

Erosion of the distributing grid and its supports and other reactor internals has been thought to be simply a matter of impact erosion due to the continued high momentum of the catalyst particles for some distance after reduction in the vapor carrying velocity upon discharge into the reactor. Accordingly, it has been thought that proper design of the cone and grid should eliminate erosion at this point, i. e. by employing a cone of about a 45° base angle and positioning the grid at least one grid radius above the point of discharge at the apex of the cone. In this way, the grid will be out of the direct blast due to its height, and the sides of the cone will be out of the blast since the catalyst stream flares out at a unique angle of less than 45° so that catalyst fill-in provides a cushioning action. Surprisingly, however, it has been found that erosion persists with the side entry design despite these design expedients which eliminate erosion due to direct impact effects. The straight vertical feed entry of my invention which provides a straight line path of flow of at least 5 to 10 pipe diameters in length after any bend or deflection in flow before discharge at the bottom of the feed cone substantially eliminates destructive erosion. Erosion elimination is important in the economic sense not only in terms of replacement costs of equipment but even important in terms of operating losses through excessive down time during periods of turn around or perhaps in extreme cases due to actual shutdown of the unit.

In application of my invention therefore the minimum length for straight flow of feed mixture after any pipe bend should be about 5 to 10 pipe diameters to substantially eliminate eddy erosion. Under typical fluid reactor conditions, the oil vapor velocity will be about 15 to 35 feet per second in the feed riser. At lower velocities down to the fluidized bed velocities slugging occurs as this is a phase of transition between carrying and fluidized bed conditions. Velocities above 35 feet per second become quite erosive. The area of the grid and thus of the top of the feed cone generally is at least ½ and preferably ⅔ or more of the area of the vessel. The free area of the grid, that is the area of the perforations, usually is designed for about 1 pound pressure drop. The length of the stripping column under the above conditions may be varied somewhat but will approximate the length of the vertical riser. About 2 to 3 minutes residence time for the spent catalyst in contact with stripping steam is typical of design figures giving good results. The fact that the spent catalyst is handled wholly within an annular section permits reduction in the amount of stripping steam required and results in a reduction in the amount of catalyst to fill the stripping section and thus the necessary catalyst inventory for the unit. The fact that the spent catalyst undergoing stripping is in heat exchange relation with the incoming feed mixture also contributes substantially to the high efficiency of the stripping operation.

I claim:

1. In apparatus for fluid catalyst cracking, a vertically elongated reaction chamber having a cone-shaped hopper bottom, a vertically elongated stripping column depending from said hopper bottom, a feed cone co-axially positioned within the hopper bottom with the walls of the feed cone being spaced a relatively small distance from and substantially parallel to the walls of the hopper bottom and extending upwardly into the hopper bottom, a distributing grid covering the upper end of the feed cone, a feed pipe having a straight vertical section of 5 to 10 pipe diameters length co-axially positioned within the stripping column and extending vertically upward into the lower end of the feed cone, and means for injecting a gaseous stripping medium at the lower end of the stripping column.

2. In fluid catalyst operations for the conversion of hydrocarbons of the type wherein finely divided catalyst is continuously circulated between a regeneration chamber and a separate reaction chamber, catalyst withdrawn from the regenerator is suspended in hydrocarbon vapors to be converted, the suspension is introduced to the lower portion of the reaction chamber, spent catalyst is separated from vapors the spent catalyst is stripped of readily vaporizable hydrocarbons by contact with a gaseous stripping medium and is withdrawn from the bottom of the reaction chamber for recirculation to the regeneration chamber, the steps of passing the suspension of catalyst and hydrocarbon vapors vertically upward at a hydrocarbon vapor velocity of about 15 to 35 feet per second through a conduit which provides a straight path of 5 to 10 times its transverse dimension within a stripping column co-axially positioned below the reaction chamber, uniformly discharging the suspension upwardly and outwardly into the lower portion of the reaction chamber, circulating spent catalyst from the bottom of the reaction chamber downward in an unobstructed annular path of constricted cross-section surrounding and in heat exchange relationship with the upwardly passing suspension of catalyst and hydrocarbon vapors, stripping readily vaporizable hydrocarbons from the spent catalyst by injecting the gaseous stripping medium at the lower end of the annular path of downwardly descending spent catalyst, and withdrawing stripped spent catalyst from the bottom of the stripping column.

HERMAN I. RINGGENBERG.

REFERENCES CITED

The following references are of record in the file of this patent:

UNITED STATES PATENTS

| Number | Name | Date |
|---|---|---|
| 2,391,944 | Carlsmith | Jan. 1, 1946 |
| 2,562,225 | Wickham et al. | July 31, 1951 |